United States Patent
Kley et al.

(10) Patent No.: US 8,191,371 B2
(45) Date of Patent: Jun. 5, 2012

(54) DRIVE TRAIN, PARTICULARLY FOR MOTOR VEHICLES

(75) Inventors: Markus Kley, Ellwangen (DE); Steffen Kammerer, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 323 days.

(21) Appl. No.: 12/449,999

(22) PCT Filed: May 8, 2008

(86) PCT No.: PCT/EP2008/003690
§ 371 (c)(1),
(2), (4) Date: Nov. 9, 2009

(87) PCT Pub. No.: WO2008/135288
PCT Pub. Date: Nov. 13, 2008

(65) Prior Publication Data
US 2011/0030370 A1 Feb. 10, 2011

(30) Foreign Application Priority Data
May 8, 2007 (DE) .......................... 10 2007 022 042

(51) Int. Cl.
 *F02B 33/44* (2006.01)
 *F02G 3/00* (2006.01)
 *F16D 33/02* (2006.01)

(52) U.S. Cl. ................. 60/608; 60/624; 60/598; 60/348
(58) Field of Classification Search ................. 60/605.1, 60/624; 192/58.3
See application file for complete search history.

(56) References Cited

U.S. PATENT DOCUMENTS

| | | | |
|---|---|---|---|
| 2,585,968 A | 2/1952 | Schneider | |
| RE24,157 E * | 5/1956 | Johnson et al. | 60/350 |
| 4,815,282 A * | 3/1989 | Wilkinson et al. | 60/247 |
| 4,882,906 A * | 11/1989 | Sekiyama et al. | 60/624 |
| 4,962,680 A * | 10/1990 | Kirstein | 477/32 |
| 5,033,269 A * | 7/1991 | Smith | 60/607 |
| 5,729,978 A * | 3/1998 | Hiereth et al. | 60/607 |
| 6,886,337 B2 * | 5/2005 | Friedrich et al. | 60/614 |
| 7,647,851 B2 * | 1/2010 | Adleff | 74/720 |
| 7,987,673 B2 * | 8/2011 | Kley et al. | 60/624 |
| 2004/0068986 A1 * | 4/2004 | Friedrich et al. | 60/605.3 |
| 2007/0275820 A1 * | 11/2007 | Kley et al. | 477/30 |
| 2007/0283699 A1 * | 12/2007 | Kley et al. | 60/605.2 |
| 2008/0000743 A1 * | 1/2008 | Menne | 192/3.22 |
| 2008/0216477 A1 * | 9/2008 | Kley et al. | 60/624 |
| 2009/0139231 A1 * | 6/2009 | Eberle et al. | 60/624 |
| 2011/0048000 A1 * | 3/2011 | Kley et al. | 60/598 |

FOREIGN PATENT DOCUMENTS

DE 859238 12/1952

(Continued)

*Primary Examiner* — Thomas Denion
*Assistant Examiner* — Cameron Setayesh
(74) *Attorney, Agent, or Firm* — Farjami & Farjami LLP

(57) ABSTRACT

The invention relates to a drivetrain, in particular for motor vehicles,
  having an internal combustion engine, comprising an output shaft;
  having a turbocharger, comprising an exhaust gas turbine, which is situated in the exhaust gas stream of the internal combustion engine, and a compressor driven by the exhaust gas turbine, which is situated in an air channel leading to the internal combustion engine in order to compress air for the internal combustion engine;
  the exhaust gas turbine additionally having a drive connection to an auxiliary system or to the output shaft of the internal combustion engine or being switchable into such a connection, in order to transmit drive power alternately or simultaneously from the exhaust gas turbine to the compressor or the output shaft and the auxiliary system; and
  a hydrodynamic clutch being situated in the additionally provided drive connection, comprising a bladed primary wheel and a bladed secondary wheel, which implement a working chamber with one another, which is fillable or filled with a working medium, in order to transmit drive power hydrodynamically from the primary wheel to the secondary wheel, and the primary wheel has a drive connection to the exhaust gas turbine, and the secondary wheel has a drive connection to the auxiliary system or the output shaft.
The invention is characterized in that
  the hydrodynamic clutch is switched between the exhaust gas turbine and the compressor.

20 Claims, 2 Drawing Sheets

FOREIGN PATENT DOCUMENTS

| | | |
|---|---|---|
| DE | 1027941 | 3/1954 |
| DE | 4429855 | 8/1995 |
| DE | 19924918 | 12/2000 |
| DE | 102004029828 | 1/2006 |
| DE | 102005003714 | 12/2006 |
| GB | 206845 | 2/1924 |
| GB | 820096 | 9/1959 |
| GB | 856788 | 12/1960 |
| JP | 62195420 | 8/1987 |
| SU | 1332051 | 8/1987 |

\* cited by examiner

DRIVE TRAIN, PARTICULARLY FOR MOTOR VEHICLES

This is a U.S. national phase application which is based on, and claims priority from PCT application Serial No. PCT/EP2008/003690, filed on May 8, 2008, which claims priority from foreign application Serial No. 102007022042.3, filed on May 8, 2007 in Germany.

The present invention relates to a drivetrain, in particular a motor vehicle drivetrain, having a turbocharged internal combustion engine. Turbocharging of an internal combustion engine is understood as the provision of a so-called turbocharger, comprising an exhaust gas turbine in the exhaust gas stream of the internal combustion engine and a compressor in an air channel leading to the internal combustion engine, the compressor being driven using the exhaust gas turbine, in that the latter withdraws energy from the exhaust gas, and the compressor pre-compressing air which is sucked in from the surroundings and supplied to the internal combustion engine for the combustion of the fuel in the internal combustion engine.

Such drivetrains having turbocharged internal combustion engines are known in numerous embodiments. In many embodiments, two exhaust gas turbochargers are provided, i.e., having two exhaust gas turbines connected in parallel or in series to one another, which each drive a compressor for air for the internal combustion engine.

Furthermore, so-called turbo-compound systems are known, in which energy is withdrawn from the exhaust gas of the internal combustion engine using an exhaust gas turbine, typically referred to as an exhaust gas power turbine, converted into drive power, and supplied to the output shaft, in particular the crankshaft of the internal combustion engine, via a drive connection, in which a hydrodynamic clutch can be situated. The exhaust gas power turbine is typically situated in the flow direction of the exhaust gas behind the exhaust gas turbine of the turbocharger and there is no mechanical connection between the two systems—turbocharger and turbo-compound.

The known systems have certain disadvantages, although they already allow clearly fuel-optimized driving of a motor vehicle in various velocity and speed ranges. Thus, turbocharger systems are known to have a so-called turbo lag in operating states having a low exhaust gas stream, i.e., at low speeds of the internal combustion engine. In contrast, turbo-compound systems are typically used in addition to turbocharger systems and thus increase the complexity and number of parts of the drivetrain. Furthermore, only those energy components are available in the exhaust gas stream to the exhaust gas power turbine which have not already been withdrawn from the exhaust gas stream by the exhaust gas turbine of the turbocharger. Finally, the turbo-compound systems have no significant influence on the desired avoidance of the turbo lag.

The document JP 62195420 describes a drivetrain having a generator driven by an internal combustion engine. The output shaft of the internal combustion engine has a drive connection to a turbocharger-compressor unit via a hydrodynamic clutch and a shift transmission. The turbocharger-compressor unit has an exhaust gas turbine and a compressor, which are situated on a common shaft, the shaft also carrying a gearwheel of the shift transmission. The exhaust gas turbine is impinged with exhaust gas from the internal combustion engine, which is additionally heatable using a burner. The compressor turbocharges the internal combustion engine, in that it comprises fresh air and supplies it to the internal combustion engine via a charge air cooler.

Published application DE 10 2004 029 828 A1 describes an exhaust gas turbocharger for an internal combustion engine having a compressor and a turbine, the compressor and the turbine being connected rotationally fixed via a shaft. An electrical machine, which is operable both as a motor and also as a generator, is provided coaxially and in a drive connection with the turbocharger shaft. Furthermore, the turbocharger shaft is connected to the output shaft of the internal combustion engine via a belt transmission or a gearwheel transmission.

Patent specification DE 10 2005 003 714 B4 describes a compressor which can be switched in via a shift clutch for a turbo-compound system. The clutch can be implemented as a clutch which can be filled and emptied hydraulically. For the function, it is absolutely necessary for the first clutch half to be connected to the exhaust gas turbine and the second clutch half to be connected to the compressor.

The invention is based on the object of disclosing a drivetrain, in particular a motor vehicle drivetrain, which operates even more efficiently than the cited drivetrains in regard to the fuel use. In particular, the cited problems are to be avoided and the occurrence of a turbo lag is advantageously additionally to be eliminated. The drivetrain is also to be improved in regard to its construction, in particular with regard to a mechanical power transmission and a hydrodynamic power transmission.

The object according to the invention is achieved by a drivetrain having the features of claim 1. Advantageous and particularly expedient embodiments of the invention are disclosed in the dependent claims.

The drivetrain according to the invention has an internal combustion engine having an output shaft, in particular a crankshaft. The exhaust gas turbine of a turbocharger is situated in the exhaust gas stream of the internal combustion engine, and the compressor of the turbocharger is situated in the fresh air stream to the internal combustion engine. It is thus a so-called turbocharged internal combustion engine.

In addition, according to the invention, the exhaust gas turbine has a drive connection to an auxiliary system of the drivetrain, such as a pump, a fan, an electrical generator, or the drive shaft of another system. The drive power of the exhaust gas turbine thus can be used not only to drive the compressor, but rather also to drive the at least one further auxiliary system. If this is an auxiliary system which is capable of providing a drive torque and/or drive power itself, at least in specific operating states, such as an electrical generator, which is also drivable by a motor, drive power can be transmitted from the auxiliary system to the exhaust gas turbine and/or, if a bypass of the exhaust gas turbine in regard to the power flow is provided, to the compressor, in order to avoid the occurrence of a turbo lag. A hydrodynamic clutch is situated in the drive connection between the exhaust gas turbine and the auxiliary system, in particular a controllable hydrodynamic clutch, which provides a rotational oscillation damping and thus protects the exhaust gas turbine from rotational oscillations if a compressor, for example, in particular a piston compressor, for example, of a motor vehicle compressed air system, is driven as the auxiliary system. The hydrodynamic clutch is connected according to the invention between the exhaust gas turbine and the compressor, in other words, it is situated between the exhaust gas turbine and the compressor. Such a configuration is understood in particular to include embodiments in which the drive power flow runs from the exhaust gas turbine via the primary wheel of the hydrodynamic clutch, but particularly not via the secondary wheel, or in which the corresponding drive power flow leads via a rotational element connected rotationally fixed to the primary wheel of the hydrodynamic clutch, in particular a gearwheel or belt pulley, which revolves at the same speed as the primary wheel and is advantageously connected directly thereto, is implemented integrally therewith, or is carried on a common shaft.

A so-called turbo-compound system is particularly advantageously provided in the drivetrain, which manages without an additional exhaust gas turbine and/or exhaust gas power turbine, in contrast to known embodiments, however. In this embodiment of the invention, drive power is introduced into the crankshaft, the drive power being obtained from exhaust gas energy, by the exhaust gas turbine of the turbocharger and not by an exhaust gas power turbine provided in addition to the turbocharger exhaust gas turbine, which is situated in the exhaust gas stream behind the turbocharger exhaust gas turbine. In the meaning of the previously described basic idea of the present invention, in this exemplary embodiment, the output shaft of the internal combustion engine and/or the internal combustion engine itself is the auxiliary system, which is driven using the exhaust gas turbine in addition to the compressor of the turbocharger.

Drive power can thus be transmitted from the exhaust gas turbine of the turbocharger alternately either exclusively to the compressor of the turbocharger or the output shaft, in particular the crankshaft of the internal combustion engine. Alternatively or additionally, a power transmission of drive power of the exhaust gas turbine of the turbocharger to the compressor and the output shaft of the internal combustion engine simultaneously is possible. Finally, it can be advantageous, in particular in operating states having a comparatively small exhaust gas stream, i.e., for example, at low speeds of the internal combustion engine, in which only a small exhaust gas quantity is available, for drive power to be transmitted from the crankshaft to the compressor on the basis of the provided drive connection, so that a turbo gap can be avoided.

In order to avoid a transmission of rotational oscillations from the crankshaft and/or general output shaft of the internal combustion engine to the exhaust gas turbine, a hydrodynamic clutch is situated in the drive connection between the output shaft and the exhaust gas turbine. Such a hydrodynamic clutch has a bladed primary wheel, also called a pump wheel, and a bladed secondary wheel, also called a turbine wheel, which implement a working chamber, which is particularly toroidal, and is fillable or filled with a working medium, with one another. If the primary wheel is set into revolution, it accelerates the working medium in the working chamber radially outward, so that a working medium circulation results in the working chamber, using which drive power and/or torque can be transmitted to the secondary wheel. Of course, it is also possible to drive the secondary wheel mechanically, in order to transmit drive power hydrodynamically to the primary wheel using the working medium circulation. If the primary wheel has a mechanical drive connection to the exhaust gas turbine and the compressor, and the secondary wheel has a mechanical drive connection to the output shaft of the internal combustion engine, a hydrodynamic power transmission occurs from the secondary wheel to the primary wheel whenever drive power is transmitted from the output shaft to the compressor, while in contrast a hydrodynamic power transmission occurs from the primary wheel to the secondary wheel whenever drive power is transmitted from the exhaust gas turbine to the output shaft and/or the compressor. In this embodiment, the hydrodynamic clutch is also connected between the exhaust gas turbine and the compressor.

The drive connection between the exhaust gas turbine and the compressor is preferably a slip-free connection, in particular an exclusively mechanical connection. The primary wheel of the hydrodynamic clutch is then also in a mechanical connection with the exhaust gas turbine and the compressor and is situated between the exhaust gas turbine and the compressor in the drive connection in regard to the power flow.

The exhaust gas turbine, more precisely its turbine wheel, the primary wheel, and the compressor, more precisely its compressor wheel, may revolve at the same speed and be situated jointly on a shaft, for example. In particular, all three components are carried rotationally fixed by a common shaft. In contrast, a speed-reducing step down gear is typically provided between the secondary wheel and the output shaft, which can be implemented via a gearwheel transmission, in particular cylindrical gearing.

Alternatively, the primary wheel of the hydrodynamic clutch has a mechanical drive connection to the exhaust gas turbine via a first transmission and has a mechanical drive connection to the compressor via a second transmission. The transmissions may be implemented as gearwheel transmissions, in particular in the form of a single gearwheel step each, comprising two gearwheels, for example, or also as a belt transmission, for example. Of course, other forms of transmission, also non-mechanical transmissions, are possible.

The primary wheel of the hydrodynamic clutch is particularly advantageously connected to a gearwheel, in particular an external gearwheel, or carries such a gearwheel, in particular on its external circumference. The gearwheel advantageously meshes with a first gearwheel associated with the exhaust gas turbine and a second gearwheel associated with the compressor. For example, the gearwheel associated with the exhaust gas turbine can be situated on a common shaft with the exhaust gas turbine, and/or can be implemented integrally with the exhaust gas turbine. Correspondingly, the second gearwheel associated with the compressor can be situated on a common shaft with the compressor or, for example, be implemented integrally with the compressor. Exhaust gas turbine and compressor are to be understood in this case as particular rotors of these components. Of course, it is also possible to implement another type of transmission correspondingly. Thus, for example, the primary wheel of the hydrodynamic clutch can be connected to a belt pulley or carry such a belt pulley, in particular again on its external circumference. The belt pulley accordingly has a drive connection via one or two belts to a belt pulley associated with the exhaust gas turbine and a belt pulley associated with the compressor. The statements made on the gearwheels apply accordingly.

The exhaust gas turbine can be a radial-axial turbine, for example, i.e., the exhaust gas stream flows radially from the outside into the exhaust gas turbine and flows out of the turbine in the axial direction of the exhaust gas turbine. For this purpose, a spiral is implemented in the turbine housing in particular, which applies a large peripheral component to the exhaust gas stream, so that the exhaust gas is incident on the turbine wheel essentially oriented in the peripheral direction, sets the turbine wheel into rotational movement, and is deflected in the axial direction of the rotational axis of the turbine wheel and flows out of the turbine wheel.

In special embodiments, it is possible that not only the compressor of the turbocharger and the crankshaft are driven using the exhaust gas turbine of the turbocharger, but rather an additional system is provided or multiple additional systems are provided, which is/are driven using the exhaust gas turbine of the turbocharger. An additional system can be an air compressor of a motor vehicle compressed air system, which feeds compressed air into the motor vehicle compressed air system. Another assembly can be a coolant water pump, which is situated in the vehicle coolant loop, in order to circulate the coolant water (or generally a predetermined coolant medium) in the vehicle coolant loop. For example, the internal combustion engine and/or the hydrodynamic clutch and/or the exhaust gas can be cooled using this vehicle coolant loop.

In order to be able to deliberately control or regulate the power transmission from the exhaust gas turbine of the turbocharger to the output shaft of the internal combustion engine and in particular from the output shaft to the compressor of the turbocharger, a transmission element which can be regulated or controlled in power is advantageously provided in the drive connection between the exhaust gas turbine and the crankshaft and/or between the crankshaft and the compressor, for example, a hydrodynamic clutch which can be regulated and/or controlled. The regulation and/or control of the power transmission in the hydrodynamic clutch can be performed, for example, by deliberate variation of the degree of filling of the working chamber of the hydrodynamic clutch. Alternatively or additionally, at least one throttle element, such as a throttle ring or a throttle disk, can be provided, which can be introduced into the working chamber of the hydrodynamic clutch such that the circulation flow of the working medium in the working chamber is interfered with more or less by this throttle element. The stronger the interference of the circulation flow, the less the power transmission and/or torque transmission using the hydrodynamic clutch.

In order to be able to execute the control and/or regulation of the power transmission automatically, a control unit is advantageously provided, which is connected appropriately with the hydrodynamic clutch and optionally with further systems, such as the exhaust gas turbine or further control devices. Using such a control unit, for example, the power transmission from the output shaft of the internal combustion engine to the compressor of the turbocharger can also be set, in order to avoid the turbo lag. In particular, such a power transmission is always deliberately set using the control unit, for example, by changing the degree of filling of the working chamber or shifting the throttle element in the hydrodynamic clutch, if a relatively small exhaust gas stream is present, using which the exhaust gas turbine is impinged, for example, at low speeds of the internal combustion engine. Alternatively, the reversal of the direction of the power transmission in the hydrodynamic clutch occurs automatically without changing its power transmission capability.

Accordingly, through the system according to the invention, a very effective and deliberate exploitation of exhaust gas energy for driving the drive train and/or the motor vehicle may be performed. A further advantage is that in contrast to typical turbo-compound systems, in which the additional exhaust gas powered turbine must always be protected against overspeed, if it has a drive connection to the crankshaft via a hydrodynamic clutch, for the case in which the hydrodynamic clutch empties completely, such an overspeed protection is no longer necessary because of the typically provided mechanical drive connection between the exhaust gas turbine and the compressor of the turbocharger. Of course, it is also possible to provide the exhaust gas turbine, which has a drive connection to the turbocharger and the auxiliary system and/or the output shaft of the internal combustion engine, this also being understood to include an output shaft of a transmission connected to the internal combustion engine, with a typical turbocharger system, comprising a "separate" exhaust gas turbine and a "separate" compressor. Such a system would be a multistage turbocharged internal combustion engine.

Instead of a filling-controlled hydrodynamic clutch in the drive connection between the exhaust gas turbine and the output shaft of the internal combustion engine, a constantly filled hydrodynamic clutch can also be provided, which can be regulated via a throttle element or which cannot be regulated and/or controlled.

The hydrodynamic clutch can have teeth, in particular on the radial exterior of its secondary wheel, which mesh with a gearwheel carried by the engine output shaft or having a drive connection to the engine output shaft, in order to implement the transmission between the secondary wheel and the output shaft described above. Alternatively, such a gearwheel can also be situated on a shaft connected to the secondary wheel, in particular carrying the secondary wheel, in particular in the axial direction above the working chamber of the hydrodynamic clutch. In the event of direct mounting or integral embodiment of the turbine wheel of the exhaust gas turbine, the rotor of the compressor of the turbocharger, and the primary wheel on a common shaft and/or with a common shaft, the secondary wheel can be mounted relatively on this shaft—in particular between the rotor of the compressor and the primary wheel—i.e., carried by the shaft, but not connected rotationally fixed to the shaft, by providing at least one corresponding friction bearing and/or roller bearing between the shaft and the secondary wheel. Alternatively or additionally, it is possible to mount the secondary wheel in a stationary housing, which particularly encloses one or more of the following components: turbine wheel of the turbocharger, primary wheel, secondary wheel, and rotor of the compressor. Alternative mounting concepts are conceivable.

The invention is explained hereafter for exemplary purposes on the basis of exemplary embodiments and the figures.

Figure 1:
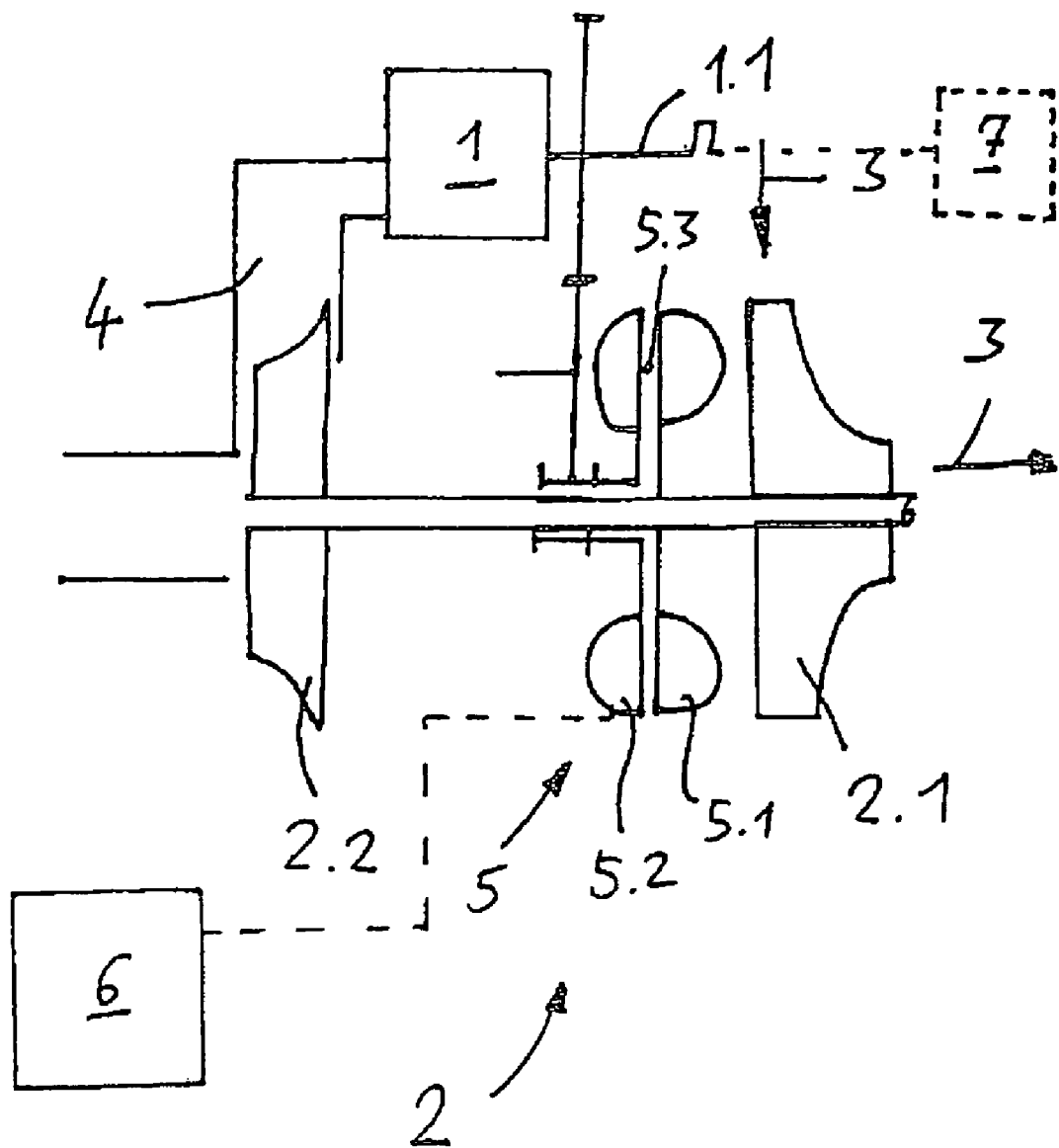
FIG. 1 shows a first exemplary embodiment of a drivetrain according to the invention.

FIG. 1 very schematically shows a drivetrain having an internal combustion engine 1, comprising an output shaft 1.1. The output shaft 1.1, for example, in the form of a crankshaft, has a drive connection to drive wheels (not shown) of the motor vehicle via a transmission (not shown here), which is driven by the internal combustion engine 1 and/or using the drivetrain.

Upon the combustion of fuel, which is mixed with air from an air channel 4 and ignited, the internal combustion engine 1 generates exhaust gas, see the schematically shown exhaust gas stream 3. The air in the air channel 4 is pre-compressed by the compressor 2.2 of the turbocharger 2. The compressor 2.2 is driven using exhaust gas energy via the exhaust gas turbine 2.1 in the exhaust gas stream 3. In the present case, the exhaust gas turbine 2.1 (and/or the turbine wheel thereof) is situated rotationally fixed on a shaft, which also carries the compressor 2.2 (and/or the compressor wheel thereof) rotationally fixed. Furthermore, this shaft carries the primary wheel 5.1 of a hydrodynamic clutch 5, in particular also rotationally fixed. The hydrodynamic clutch 5 has a secondary wheel 5.2 axially diametrically opposite to the primary wheel 5.1, which is relatively mounted on the cited shaft and implements a toroidal working chamber 5.3 with the primary wheel 5.1. The hydrodynamic clutch 5 is thus situated between the exhaust gas turbine 2.1 and the compressor 2.2. Using working medium in the working chamber 5.3, drive power is hydrodynamically transmitted from the primary wheel 5.1 to the secondary wheel 5.2 or, in specific operating states, also vice versa. Drive power can thus be transmitted from the exhaust gas turbine 2.1 via the hydrodynamic clutch

5 to the output shaft 1.1, or from the output shaft 1.1 via the hydrodynamic clutch 5 to the compressor 2.2 and/or the exhaust gas turbine 2.1, if desired.

A control unit 6 is provided for the control of the power transmission, which is connected for control and/or regulation to the hydrodynamic clutch 5 and optionally further components. In particular, this control unit 6 controls the inflow and/or outflow of working medium in the working chamber 5.3 and/or the position of a throttle element (not shown), which can be introduced into the working chamber 5.3 and/or the circulation flow of working medium in the working chamber 5.3.

In the meaning of the main idea of the present invention, the output shaft 1.1 in the exemplary embodiment shown in FIG. 1 represents an auxiliary system. Instead of the crankshaft 1.1, however, it is also possible to drive another auxiliary system, such as an electrical generator, an air-conditioning compressor, or a compressed air compressor of a motor vehicle compressed air system using the exhaust gas turbine 2.1, in particular via the illustrated drive connection with the hydrodynamic clutch 5. Such an auxiliary system is only shown schematically in dashed lines and identified by the reference numeral 7.

Figure 2:
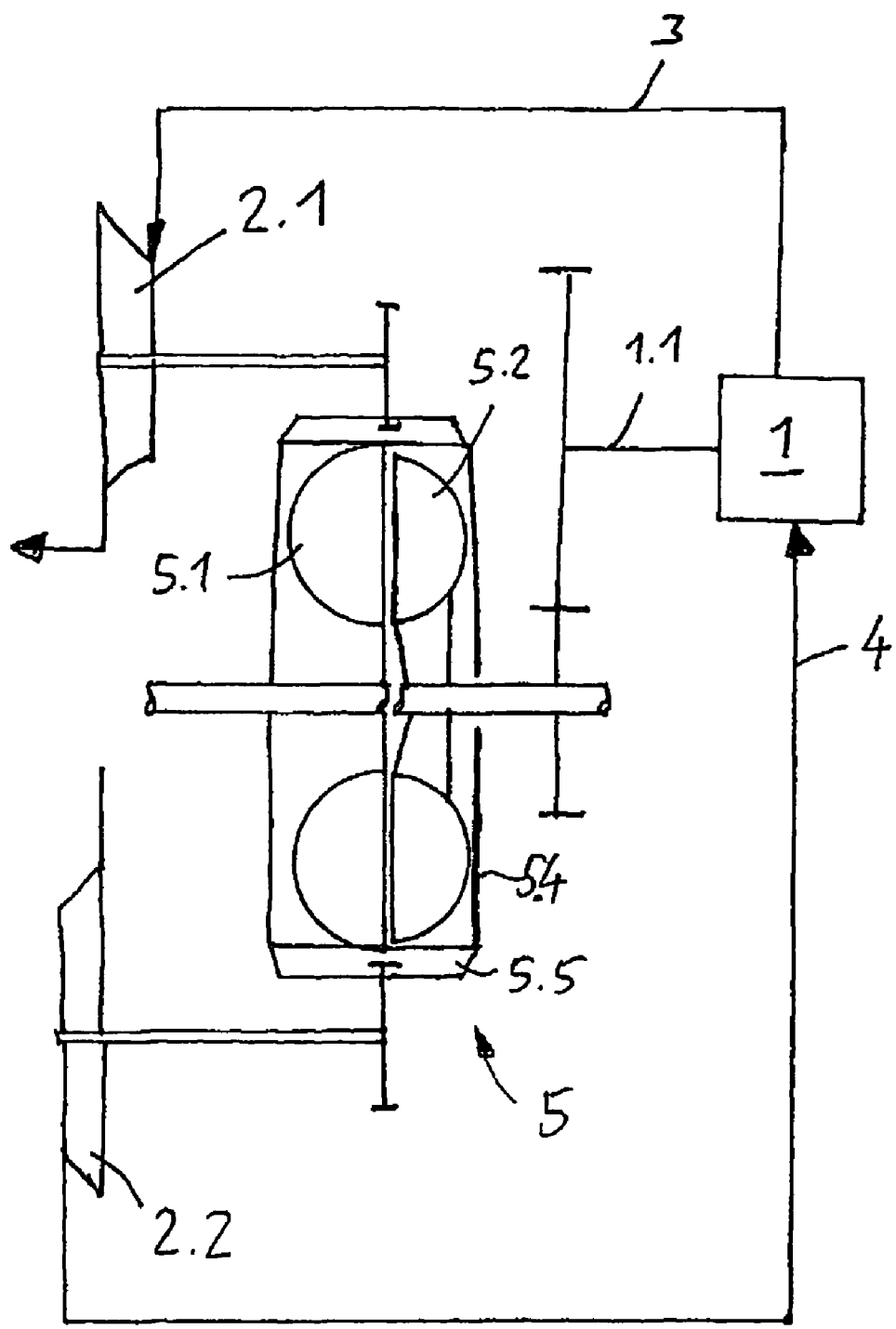
FIG. 2 shows a second exemplary embodiment of a drivetrain according to the invention.

An alternative embodiment of the invention is shown in FIG. 2, in which the exhaust gas turbine 2.1 and the compressor 2.2 are situated separately from one another, each on a separate shaft here. The drive connection between the exhaust gas turbine 2.1 and the compressor 2.2 is produced via the primary wheel 5.1 of the hydrodynamic clutch 5, this also being a purely mechanical drive connection. In the present case, the primary wheel 5.1 of the hydrodynamic clutch 5 is situated on a shaft provided in addition to the shafts of the exhaust gas turbine 2.1 and the compressor 2.2.

The secondary wheel 5.2 of the hydrodynamic clutch 5 is situated on a further shaft, which has a mechanical drive connection to the output shaft 1.1 of the internal combustion engine 1, in the present case via a step-down gear having two gearwheels.

In the exemplary embodiment shown, the primary wheel 5.1 and/or the clutch shell 5.4 attached to the primary wheel 5.1, which encloses the secondary wheel 5.2 together with the primary wheel 5.1, carry/carries teeth 5.5 on the external circumference thereof. These teeth 5.5 mesh with the gearwheel associated with the exhaust gas turbine 2.1 and the gearwheel associated with the compressor 2.2.

The gearwheel associated with the exhaust gas turbine 2.1 advantageously has the same external diameter and/or the same roller diameter as the gearwheel associated with the compressor 2.2. In this way, the transmission ratio between the primary wheel 5.1 of the hydrodynamic clutch 5 and the exhaust gas turbine 2.1 is the same as the transmission ratio between the primary wheel 5.1 and the compressor 2.2, so that the compressor 2.2 and the exhaust gas turbine 2.1 revolve at the same speed. The teeth 5.5 advantageously have a larger diameter than the gearwheels of the exhaust gas turbine 2.1 and the compressor 2.2 which mesh therewith, so that the primary wheel 5.1 of the hydrodynamic clutch 5 revolves more slowly than the exhaust gas turbine 2.1 and the compressor 2.2.

Of course, notwithstanding the illustration shown in FIG. 2, it is also possible to provide, instead of the teeth 5.5 on the external circumference of the hydrodynamic clutch 5, a gearwheel provided laterally adjacent to or on the hydrodynamic clutch 5, which revolves together with the primary wheel 5.1. Other transmissions, such as belt transmissions, are also possible.

The invention claimed is:

1. A drivetrain, in particular for motor vehicles,
having an internal combustion engine, comprising an output shaft;
having a turbocharger, comprising an exhaust gas turbine, which is situated in the exhaust gas stream of the internal combustion engine, and a compressor, driven by the exhaust gas turbine, which is situated in an air channel leading to the internal combustion engine in order to compress air for the internal combustion engine;
the exhaust gas turbine additionally having a drive connection to an auxiliary system or to the output shaft of the internal combustion engine or being switchable into such a connection, in order to alternately or simultaneously transmit drive power from the exhaust gas turbine to the compressor and the auxiliary system or the output shaft; and
a hydrodynamic clutch being situated in the additionally provided drive connection, comprising a bladed primary wheel and a bladed secondary wheel, which implement a working chamber with one another, which is fillable or filled with a working medium, in order to hydrodynamically transmit drive power from the primary wheel to the secondary wheel, and the primary wheel has a drive connection to the exhaust gas turbine, and the secondary wheel has a drive connection to the auxiliary system or the output shaft;
characterized in that
the hydrodynamic clutch is switched between the exhaust gas turbine and the compressor, in that the primary wheel of the hydrodynamic clutch is mechanically connected to a gearwheel or carries such a gearwheel, in particular on its external circumference, which meshes with a gearwheel revolving with the exhaust gas turbine or a gearwheel revolving with the compressor, so that the primary wheel of the hydrodynamic clutch has a mechanical drive connection to the exhaust gas turbine and the compressor.

2. The drivetrain according to claim 1, characterized in that the primary wheel of the hydrodynamic clutch has the same transmission ratio to the exhaust gas turbine and to the compressor.

3. The drivetrain according to one of claim 2, characterized in that one or more of the following components is driven as the auxiliary system;
a fan wheel, in particular of the motor vehicle cooling system
a pump
an additional compressor, in particular a stroke piston compressor
a compressed air compressor of a motor vehicle compressed air system
an electric generator, which can particularly also be driven by a motor,
an air-conditioning compressor.

4. The drivetrain according to one of claim 2, characterized in that the secondary wheel has a mechanical drive connection to the output shaft.

5. The drivetrain according to one of claim 2, characterized in that the output shaft and the secondary wheel are connected to one another via a gearwheel transmission, in particular cylindrical gearing.

6. The drivetrain according to one of claim 2, characterized in that the exhaust gas turbine is a radial-axial turbine.

7. The drivetrain according to one of claim 2, characterized in that at least one further system, in particular an air compressor of a motor vehicle compressed air system or a coolant water pump, has a drive connection to the exhaust gas turbine or is switchable into such a connection, in order to be driven by the exhaust gas turbine.

8. The drivetrain according to one of claim 2, characterized in that the hydrodynamic clutch can be regulated or controlled in its power transmission, in particular by deliberate variation of the degree of filling of the working chamber with working medium and/or by more or less interference of a circulation flow of working medium in the working chamber by introducing a throttle element such as a throttle ring or a throttle disk.

9. The drivetrain according to one of claim 1, characterized in that one or more of the following components is driven as the auxiliary system:
 a fan wheel, in particular of the motor vehicle cooling system
 a pump
 an additional compressor, in particular a stroke piston compressor
 a compressed air compressor of a motor vehicle compressed air system
 an electric generator, which can particularly also be driven by a motor,
 an air-conditioning compressor.

10. The drivetrain according to one of claim 9, characterized in that the secondary wheel has a mechanical drive connection to the output shaft.

11. The drivetrain according to one of claim 9, characterized in that the output shaft and the secondary wheel are connected to one another via a gearwheel transmission, in particular cylindrical gearing.

12. The drivetrain according to one of claim 1, characterized in that the secondary wheel has a mechanical drive connection to the output shaft.

13. The drivetrain according to one of claim 1, characterized in that the output shaft and the secondary wheel are connected to one another via a gearwheel transmission, in particular cylindrical gearing.

14. The drivetrain according to one of claim 1, characterized in that the exhaust gas turbine is a radial-axial turbine.

15. The drivetrain according to one of claim 1, characterized in that at least one further system, in particular an air compressor of a motor vehicle compressed air system or a coolant water pump, has a drive connection to the exhaust gas turbine or is switchable into such a connection, in order to be driven by the exhaust gas turbine.

16. The drivetrain according to one of claim 1, characterized in that the hydrodynamic clutch can be regulated or controlled in its power transmission, in particular by deliberate variation of the degree of filling of the working chamber with working medium and/or by more or less interference of a circulation flow of working medium in the working chamber by introducing a throttle element such as a throttle ring or a throttle disk.

17. The drivetrain according to claim 16, characterized in that a control unit is provided, which is interconnected with the hydrodynamic clutch, in order to automatically control or regulate the power transmission using the hydrodynamic clutch.

18. The drivetrain according to claim 17, characterized in that the control unit is set up in order to, by controlling or regulating the hydrodynamic power transmission in the hydrodynamic clutch, to allocate the drive power transmitted from the exhaust gas turbine to the primary wheel deliberately via the secondary wheel to the output shall and mechanically to the compressor.

19. The drivetrain according to one of claim 17, characterized in that the control unit is set up, in order to, by controlling or regulating the hydrodynamic power transmission in the hydrodynamic clutch in predetermined operating states having a relatively small exhaust gas stream, to transmit drive power from the output shaft via the hydrodynamic clutch to the compressor.

20. The drivetrain according to one of claim 18, characterized in that the control unit is set up, in order to, by controlling or regulating the hydrodynamic power transmission in the hydrodynamic clutch in predetermined operating states having a relatively small exhaust gas stream, to transmit drive power from the output shaft via the hydrodynamic clutch to the compressor.

* * * * *